United States Patent [19]

Howe et al.

[11] Patent Number: 4,805,456

[45] Date of Patent: Feb. 21, 1989

[54] RESONANT ACCELEROMETER

[75] Inventors: Roger T. Howe, Belmont, Mass.; Shih-Chia Chang, Troy, Mich.

[73] Assignee: Massachusetts Institute of Technology, Cambridge, Mass.

[21] Appl. No.: 52,026

[22] Filed: May 19, 1987

[51] Int. Cl.[4] .............................................. G01P 15/10
[52] U.S. Cl. ............................ 73/517 AV; 73/DIG. 1
[58] Field of Search ..................... 73/517 AV, DIG. 1

[56] References Cited

U.S. PATENT DOCUMENTS

| | | | |
|---|---|---|---|
| 3,382,724 | 5/1968 | Wilcox | 73/517 AV |
| 3,541,866 | 2/1968 | Mathey et al. | 73/517 AV |
| 4,517,841 | 5/1985 | Peters et al. | 73/DIG. 1 |
| 4,699,006 | 10/1987 | Boxenhorn | 73/517 AV |

OTHER PUBLICATIONS

P. W. Barth, "Silicon Sensors Meet Integrated Circuits", 8045 *IEEE Spectrum*, vol. 18 (1981), pp. 33–39.
P. L. Chen, et al., "Integrated Silicon PI-FET Accelerometer with Proof Mass", *Sensors and Actuators*, 5:119–126 (1984).
William C. Albert, "Vibrating Quartz Crystal Beam Accelerometer", 28th Instrument Society of America International Instrumentation Symposium, *Proceedings*, 1982, pp. 33–44.
Roger T. Howe and Richard S. Muller, "Resonant-Microbridge Vapor Sensor", *IEEE Transactions on Electron Devices*, vol. ED-33, No. 4, Apr. 1986, pp. 499–506.
Martin A. Schmidt and Roger T. Howe, "Silicon Resonant Microsensors", *Ceramic Engineering and Science Proceedings, Automotive Materials Conference*, Nov. 19, 1986, pp. 1–20.
J. C. Greenwood, "Etched Silicon Vibrating Sensor", *Journal of Physics E:Scientific Instrumentation*, vol. 17, pp. 650–652, 1984.

*Primary Examiner*—Stewart J. Levy
*Assistant Examiner*—Robert P. Bell
*Attorney, Agent, or Firm*—Hamilton, Brook, Smith & Reynolds

[57] ABSTRACT

An accelerometer is provided by a sample mass suspended in a central area of a support by pairs of resonating arms. One pair of arms lies on one axis through the sample mass. Another pair of arms lies on a second axis through the sample mass perpendicular to the one axis. Acceleration of the mass and support is detected by a measured change in resonant frequency of the arms of a pair. The measured change in resonant frequency is the magnitude of the acceleration and the axis along which the pair of arms lies provides the direction of the acceleration. Orthogonal components of acceleration are simultaneously measured by the pairs of arms lying on perpendicular axes. Electrostatic force-rebalance techniques and other known techniques for measuring acceleration in a direction perpendicular to the axes of the pairs of arms are readily incorporated to provide a third direction measurement of acceleration. The accelerometer is fabricated in a monolithic process which employs micromachining techniques.

35 Claims, 8 Drawing Sheets

RESONANT ACCELEROMETER

BACKGROUND OF THE INVENTION

An accelerometer is one of the major sensors used in on-board safety control systems and navigation systems. For example, the accelerometer is used in various anti-wheel-lock, active suspension and seat belt lock-up systems of an automobile. Accelerometers are also used to detect engine misfire and engine knock.

More generally, an accelerometer is a device which measures acceleration, and in particular an accelerometer measures the force that is exerted when a moving body changes velocity. The moving body possesses inertia which tends to resist the change in velocity. It is this resistance to a sudden change in velocity that is the origin of the force which is exerted when the moving body is accelerated.

In a typical accelerometer, a mass is suspended by two springs attached to opposite sides of the mass. The mass is maintained in a neutral position so long as the system is at rest or is in motion at a constant velocity. When the system is accelerated, the spring-mounted mass will, on account of its inertia, at first lag behind the movement; one spring will thus be stretched and the second will be compressed. The force acting on each spring is equal in magnitude and is equal to the product of the weight of the mass and the acceleration (the change in velocity) experienced by the mass.

In a more recently developed accelerometer, two vibrating quartz beams each support on one end respective masses. The two beams longitudinally lie on the same axis. The device is sensitive to acceleration along this axis. Acceleration of the device causes opposite perturbations in the resonant frequencies of the beams, because inertial forces on the respective masses compress one beam and stretch the other. The output signal of the device is the frequency difference between the two beams.

Although there is quite a few different kinds of accelerometers available commercially, they share the following problems:

1. An x-direction acceleration signal is often affected by y or z-direction acceleration (and vice versa) or by non-signal motions;
2. A change in temperature may induce stress variation and hence cause inaccurate measurements; and
3. High cost.

Because of these and other problems, present accelerometers are unable to meet the requirements of reliability, accuracy, ruggedness, and low cost demanded by on-board automotive systems, and many other applications.

SUMMARY OF THE INVENTION

An object of the present invention is to provide an accurate, rugged, inexpensive accelerometer through the use of integrated circuitry and micromachining technology.

An accelerometer of the present invention comprises a sample mass suspended by pairs of arms. One end of one pair member is attached to one side of the sample mass and one end of the second pair member is attached to an opposite side of the sample mass. The opposite ends of respective pair members are attached to a common support. Pair members are longitudinally aligned with each other to form an axis through opposite sides of the sample mass.

In a preferred embodiment, a second pair of arms are similarly attached to respective opposite sides of the sample mass and form a second axis which is perpendicular to the axis formed by the first pair of arms. Each arm is excited to vibrate at a respective resonant frequency. Acceleration of the sample mass and support causes a symmetrical compression and tension in a pair of arms along a common axis and thus a change in difference between respective resonant frequencies of the pair of arms. The magnitude of this change in difference between resonant frequencies is measured by a signal processing circuit and provides an indication of acceleration along the axis formed by the respective pair of arms. Simultaneous measurement of acceleration along axes formed by other pairs of arms is similarly provided.

In the preferred embodiment, orthogonal components of acceleration are measured one along the axes formed by the first pair of arms and the other along the axis formed by a second pair of arms. The signal processing circuit includes a frequency measuring circuit for each arm.

In a preferred embodiment, each arm is electrostatically excited to its resonant frequency through a different drive electrode positioned across a gap from the arm. Further, two different sense electrodes for each arm are positioned on opposite sides of the respective drive electrode of the arm. The sense electrodes are also positioned across the gap from the respective arm. The vibration of an arm generates a time-varying capacitance across the respective gap. The sense electrodes of the arm sense any changes in the capacitance and thereby sense changes in the vibration of the arm. The sense electrodes are connected to a feedback circuit which causes the drive electrode to exert a force on the arm as a function of the sensed change in vibration to maintain vibration of the arm at its respective resonant frequency. Further, the frequency measuring circuit of each arm is connected to the respective feedback circuit. The signal-processing circuit thereafter produces an output signal of the change in difference between frequencies of each respective pair of arms which is indicative of the acceleration undergone by the mass along the axis defined by the arms.

In one design of the present invention, the drive electrodes of each arm are centrally positioned with respect to the length of the respective arm to obtain a fundamental harmonic in the excitation of the arm.

In another design of the present invention, the support extends along opposite longitudinal sides of each arm. The sense and drive electrodes bridge across respective arms between the extension of the support on opposite longitudinal sides.

The accelerometer of the present invention may also include measurement of acceleration along an axis perpendicular to the two axes of the preferred embodiment. Such measurement may include additional arms attached to the sample mass. The additional arms deflect in response to accelerations perpendicular to the axis of the beam. The deflections of the arms are directly measured by means of piezoresistive, piezoelectric or capacitive techniques. Such measurement may be accomplished by attaching a mounting to the support and capacitively measuring deflection of the arms suspending the sample mass with respect to the mounting.

Measurement perpendicular to the two axes of the preferred embodiment may be achieved by means of electrostatic force-rebalance techniques. This means requires electrodes on the support and on the sample mass or support arms for supplying an electrostatic force to cancel deflection of the sample mass due to perpendicular acceleration. In this technique, the output signal for perpendicular acceleration is conveniently the voltage applied to the electrodes on the support.

In accordance with the low-cost feature of the present invention, an eight level mask set is designed without on-chip circuitry for the fabrication of the accelerometer. A first structural layer is deposited over a silicon wafer. The pairs of arms are delineated in the first structural layer. A sacrificial layer is then deposited on the first structural layer. A second structural layer is deposited onto the sacrificial layer, and the drive and sense electrodes are delineated into the second structural layer. The sample mass is shaped by etching through the backside of the silicon wafer. After shaping the samaple mass, the sacrificial layer and part of the wafer are removed to isolate the sample mass suspended by the pairs of arms and to free central areas of the drive and sense electrodes over the arms. End regions of the drive and sense electrodes are supported by delineated extensions of the wafers along opposite longitudinal sides of the arms.

In another design of the present invention, microfabricated constraining arms suppress rotation of the sample mass and thereby increase dynamic range of the accelerometer. The additional constraining arms are micromachined, from heavily boron doped layers, on the backside of the silicon wafer. During shaping of the sample mass, undercutting occurs and forms the constraining arms. Deflection of the constraining arms may be measured to provide an indication of acceleration along an axes perpendicular to the axes formed by the arms which suspend the sample mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1b is a cross-section along the x-axis of the accelerometer of FIG. 1a.

FIG. 1c is a cross-section along line Ic—Ic of the accelerometer of FIG. 1a.

DETAILED DESCRIPTION OF A PREFERRED EMBODIMENT

Figure 1A:
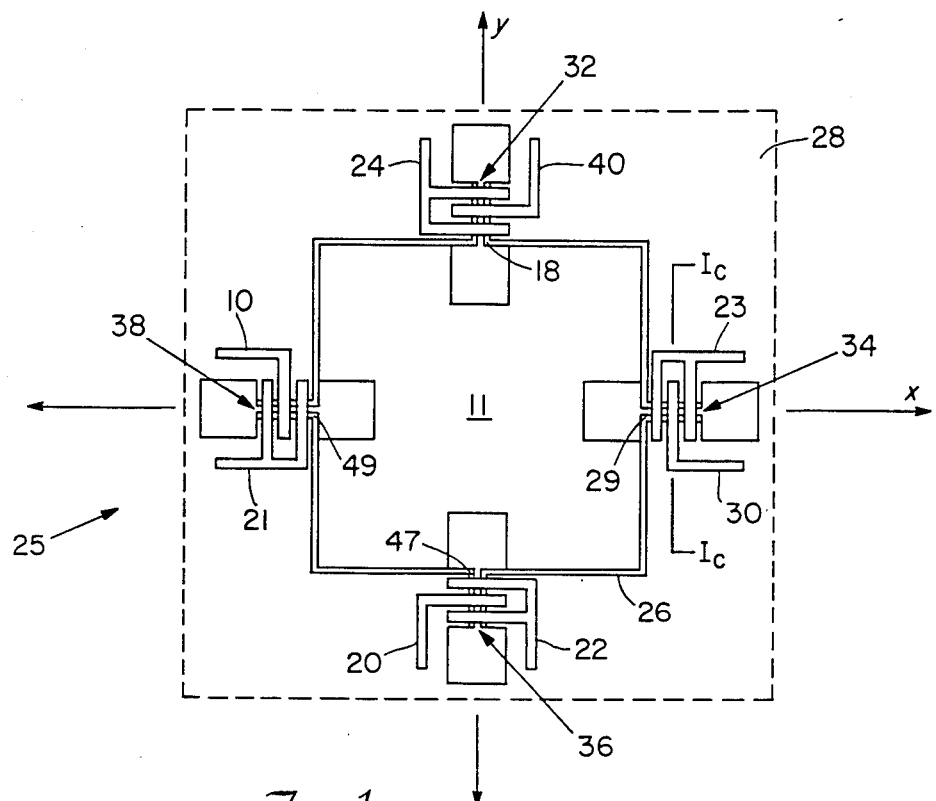
FIG. 1a is a top plan view of an accelerometer embodying the present invention.
Figure 1B:
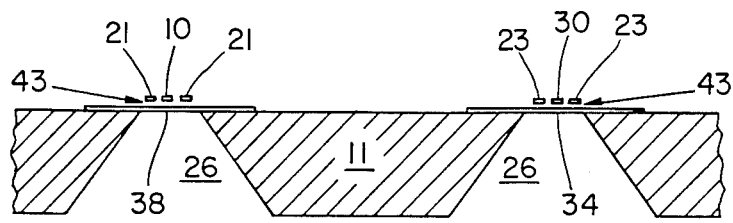

An accelerometer 25 embodying the present invention is shown in FIGS. 1a and 1b. A sample mass or weight 11 is suspended within a centrally located opening 26 in a substrate 28. Weight 11 is suspended by four beams 32, 34, 36 and 38 which longitudinally bridge across opening 26 between substrate 28 and weight 11 and lie within respective slots 18, 29, 47, 49 of substrate 28. Beams 32 and 36 lie opposite each other across weight 11 and lie on a common axis which is labelled the y-axis for illustration in FIG. 1a. Beams 34 and 38 similarly lie opposite each other across weight 11 but on an x-axis perpendicular to the y-axis.

Figure 1C:
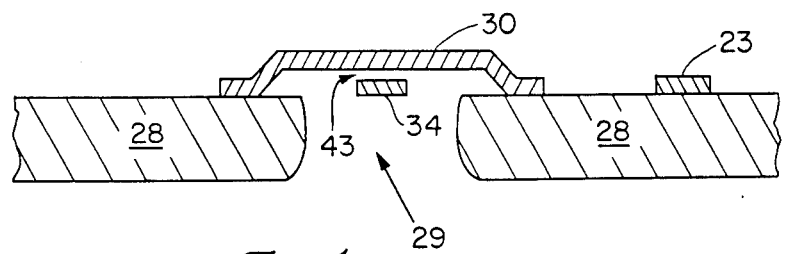

Four sets of drive 10, 20, 30, 40 and sense 21, 22, 23, 24 electrodes are capacitively coupled to the four beams 32, 34, 36, 38, one set to a beam. As illustrated in FIG. 1b, a cross-section along the x-axis of FIG. 1a, each set of drive and sense electrodes lies across gap 43 from a respective beam. Further, each set of sense and drive electrodes bridges laterally across the respective beam as shown in FIGS. 1a and 1c. End regions of each electrode are supported by respective edges of substrate 28 which form slots 18, 29, 47 and 49.

This is more clearly shown by the illustration of slot 29 and beam 34 in FIG. 1c which is a cross-section through drive electrode 30 along line Ic—Ic of FIG. 1a. Drive electrodes 20, 10, 40 and respective beams 36, 38 and 32 are similarly positioned about slots 47, 49 and 18, respectively, of substrate 28 in FIG. 1a.

The beams 32, 34, 36 and 38 are resonated at respective fixed resonant frequencies through the respective sense 24, 23, 22, 21 and drive electrodes 40, 30, 20, 10 as is discussed later. When weight 11 and substrate 28 experience an acceleration in the positive x-direction, beam 38 becomes compressed while beam 34 is stretched. Consequently, the resonant frequency associated with beam 38 decreases and that associated with beam 34 increases. The difference of the two changed resonant frequencies is used as the sensor 25 output. In particular, the difference of the two resonant frequencies before and after acceleration of weight 11 and substrate 28 provides a change in differential resonant frequency between beams along a common axis. The magnitude of this change is the magnitude of the sensed acceleration and the associated axis provides the direction of the sensed acceleration.

Negative x-direction acceleration is similarly detected where beam 38 is stretched and beam 34 is compressed, and the resonant frequency of beam 38 increases and that of beam 34 decreases. Similar detection of positive and negative y-direction acceleration is provided by the symmetrical stretching and compressing of beams 32 and 36, and by the changing of their respective resonant frequencies.

In a preferred embodiment, a frequency measuring circuit is connected to each beam (not shown here). A frequency measuring circuit as is known in the art and referenced in Paul Horowitz and Winfield Hill, "The Art of Electronics", Cambridge University Press, 1980, pgs. 617-620, such as a frequency counter or a phase locked loop, is suitable. Such a frequency measuring circuit is herein incorporated by reference. Each frequency measuring circuit provides a signal processing circuit with a measured frequency of a beam. The signal processing circuit then provides the difference in measured frequencies between beams along a common axis as an indication of acceleration along the common axis.

The differential frequency detection scheme is mathematically based on a Taylor expansion of resonant frequency calculated by Rayleigh's Energy Method. Resonant frequency (f) is solved for in Rayleigh's Energy Method by equating maximum potential energy of vibration to the maximum kinetic energy. Applying this method to a bridge under axial tension, as in beams 34 and 38 in the foregoing example of a positive x-direction acceleration, the following results.

The potential energy of each beam will contain terms due to both bending and axial tension. The maximum bending potential energy, $U_B$, of a beam is expressed as $$U_B = \frac{EI}{2} \int_0^L \left[ \frac{d^2w(x)}{dx^2} \right]^2 dx \quad (1)$$

where L is the length of the beam, w(x) is the envelope function or mode shape of the beam, E is modulus of elasticity, and I is the beam cross-section moment of inertia. The product EI represents the flexural rigidity for bending. The maximum potential energy due to axial tension or the stretching strain energy $U_{st}$ of the beam is expressed as $$U_{st} = \frac{MA_x}{4} \int_0^L \left[ \frac{dw(x)}{dx} \right]^2 dx \quad (2)$$

where M is the mass of weight 11, and $A_x$ is acceleration along the x-axis. The kinetic energy maximum is expressed as $$KE_{max} = \frac{\rho bt}{2} (2\pi f)^2 \int_0^L w^2(x) \, dx \quad (3)$$

where $\rho$ is specific density of beam material, b and t are width and thickness, respectively of the beam, and f is resonant frequency of the beam. Hence, following Rayleigh's Energy Method $$KE_{max} = U_B + U_{st}$$

$$\frac{\rho bt}{2} (2\pi f)^2 \int_0^L w^2(x) \, dx = U_B + U_{st}$$

$$(2\pi f)^2 = \frac{U_B + U_{st}}{\frac{\rho bt}{2} \int_0^L w^2(x) \, dx}$$

-continued $$f = \frac{1}{2\pi} \left[ \frac{U_B + U_{st}}{\frac{\rho bt}{2} \int_0^L w^2(x) dx} \right]^{\frac{1}{2}}$$

The first mode shape $w_1(x)$ for a vibrating bridge is tabulated in C. M. Harris and C. E. Crede, "Shock and Vibration Handbook", McGraw-Hill, 1961, pp. 7-13, 7-14 and is incorporated herein by reference. The unperturbed resonant frequency $f_0$ is then $$f_0 = 1.03(E/\rho)^{\frac{1}{2}}(t/L^2) \quad (5)$$

In the example of beam 34 which experiences stretching due to a positive x-direction acceleration $A_x$, the respective resonant frequency f becomes $$f_1 = f_0[1 + 0.293(L^2/Ebt^3)(\tfrac{1}{2}MA_x)]^{\frac{1}{2}} \quad (6)$$

Since the second term in the bracket is much smaller than unity, a Taylor expansion can be used to express resonant frequency in the form $$f_1 = f_{01} - k_{11}(MA_x) + k_{21}(MA_x)^2 - k_{31}(MA_x)^3 + \ldots \quad (7)$$

where $f_{01}$ is the unperturbed resonant frequency of arm 34 and the coefficients $k_{ij}$ are determined by the physical properties and geometrical dimensions of arm 34.

Likewise, arm 38 which experiences compression due to the positive x-direction acceleration $A_x$ has resonant frequency $$f_2 = f_{02} - k_{12}(MA_x) + k_{22}(MA_x)^2 - k_{32}(MA_x)^3 + \ldots \quad (8)$$

where $f_{02}$ is the unperturbed resonant frequency of arm 38 and coefficients $k_{ij}$ are determined by the physical properties and geometrical dimensions of arm 38.

The difference of the resonant frequencies $\Delta f$ which is used as the sensor output, is $$\Delta f = f_1 - f_2 = (f_{01} - f_{02}) + (k_{11} + k_{12})(MA_x) + (k_{21} - k_{22})(MA_x)^2 + (k_{31} + k_{32})(MA_x)^3 + \ldots \quad (9)$$

The zero order term $(f_{01} - f_{02})$ and even order terms (e.g., $k_{21} - k_{22}$) are made very small by the high degree of matching dimensions and properties of beam pair members through micromachining techniques used to fabricate sensor 25. Hence acceleration $A_x$ may be computed by relating the measured frequency difference between beam pair members to respective odd order terms (e.g. $k_{11} + k_{12}$) and the mass of weight 11. Further, the output signal of $\Delta f$ is nearly a linear function of the acceleration $A_x$ except for some perturbation from the higher order terms.

Another advantage of the differential detection scheme is that small effects due to random vertical vibration (z-direction) are factors in the resonant frequency equation of each beam and are subtracted from themselves during the calculation of the differential output $\Delta f$. Thermal effects are similarly common to all beam resonant frequencies and are mostly rejected by the differential mode of detection. The differential detection scheme thus solves the problems of z-direction acceleration or non-signal motions affecting x and y-direction acceleration measurements and temperature effects found in prior art devices.

As can be seen by the foregoing equations, the accuracy and high performance in differential measurement of the device 25 is dependent on tight dimensional control of the beams and other design considerations. One such design consideration is sensitivity R of the accelerometer. Sensitivity R in a direction along a major axis of a beam is defined as $$f - f_0 = RA$$

where f is the resonant frequency of the beam changed by acceleration A along the major axis of the beam, and $f_0$ is the unperturbed resonant frequency of the beam. In the case of stretched beam 34

$$\begin{aligned} f_1 - f_{01} &= f_0 [1 + 0.293(L^2/Ebt^3)(\tfrac{1}{2}MA_x)]^{\tfrac{1}{2}} - 1.03(E/\rho)^{\tfrac{1}{2}} (t/L^2) \quad (10) \\ &= [0.073 f_0 ML^2/Ebt^3] A_x \\ &= [0.075 M \ (\rho E)^{-\tfrac{1}{2}} (bt^2)^{-1}] A_x \\ &= R_x A_x \end{aligned}$$

where $R_x$ is the sensitivity in the x-direction of accelerometer 25.

As another design consideration, applicants look to the dynamic range, $A_{max}$, of the accelerometer. The maximum value of the positive x-direction acceleration $A_x$ that the beam 38 can take is limited by buckling under compression. From elastic buckling theory, the critical buckling load ($F_c$) is, $$F_c = 4\pi^2 EI/L^2,$$

hence $$\tfrac{1}{2}MA_x \leq 4\pi^2 EI/L^2,$$

and $$A_{x,max} = 2\pi^2 Ebt^3/3L^2M \quad (11)$$

Note that this derivation is based on in-plane acceleration approximation. In an actual situation, the center of gravity of weight 11 does not lie in the same plane with those of the four beams 32, 34, 36, 38 of FIG. 1a. Hence the dynamic range ($A_{max}$) of the accelerometer 25 may be limited by bending moment and local stress concentration.

From Eqs. (5), (10), and (11), applicants have obtained the following guidances for the design of a resonant accelerometer:
1. To have high sensitivity $R_x$ in equation 10, beam material with low $\rho$ and E is desirable.
2. Sensitivity does not depend on beam length L. Thus, L can be selected to set the resonant frequency $f_0$ of equation (5) or dynamic range $A_{max}$ of equation (11).
3. Sensitivity is proportional to $(bt^2)^{-1}$, but the dynamic range of acceleration ($A_{max}$) is proportional to $(bt^3)$. Hence, there is a trade-off between high sensitivity and wide dynamic range.

In the preferred embodiment, the beam material is either polycrystalline silicon doped with phosphorus or single crystal silicon doped with boron. The drive and sense electrode material is a phosphorus-doped polycrystalline silicon. The weight 11 is made of a slab of single crystal silicon shaped by orientation-dependent wet chemical etching. A detailed discussion on shaping of the weight is presented later.

Figure 2:
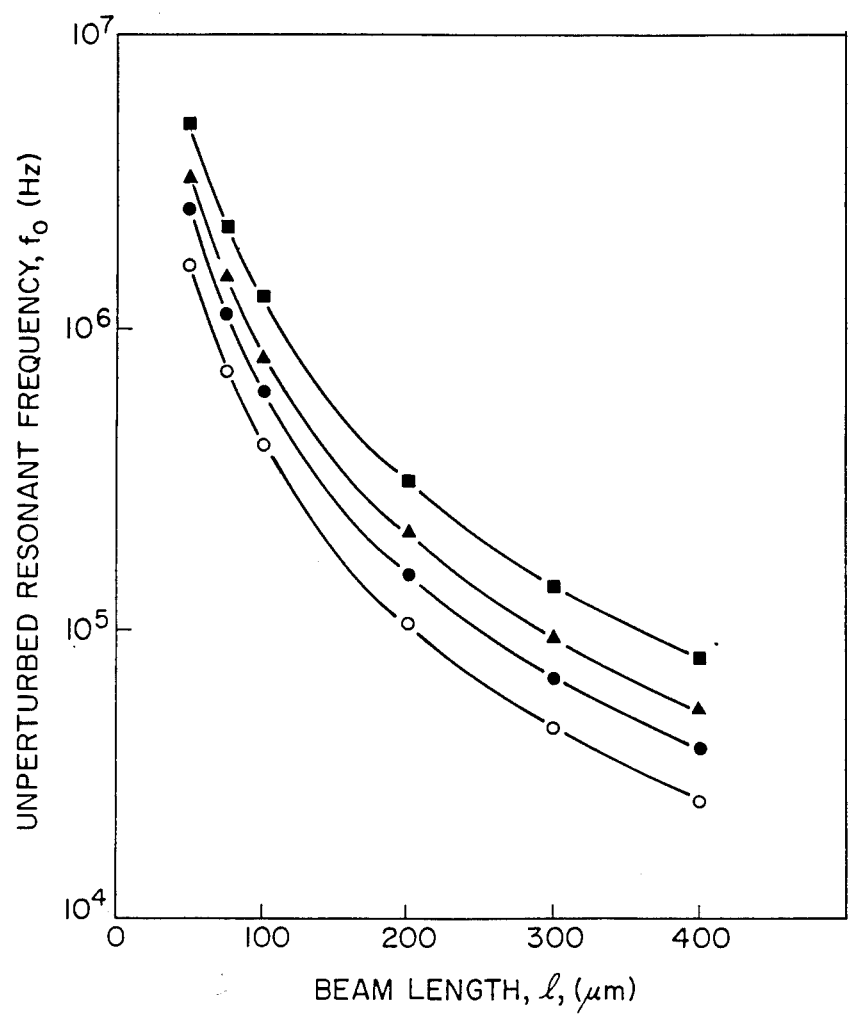
FIG. 2 is a graph of the calculated unperturbed resonant frequency ($f_o$) versus beam length (L) for 4 beam thicknesses of the embodiment of FIGS. 1a and 1b.
Figure 3:
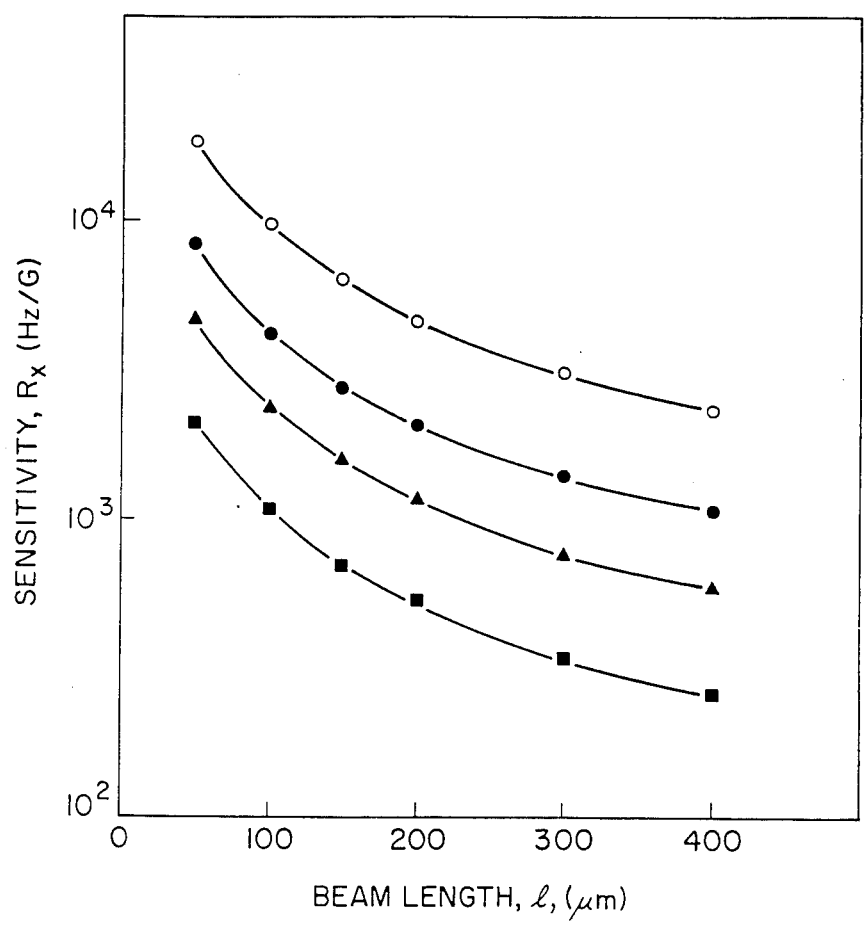
FIG. 3 is a graph of the calculated sensor sensitivity ($R_x$) versus beam length (L) for 4 different beam thicknesses.

FIG. 2 is a plot of equation (5) of the unperturbed resonant frequency $f_o$ versus beam length L with four different beam thicknesses. The beam material is single crystal Si with $E = 1.5 \times 10^{12}$ dyne/cm$^2$ and $\rho = 2.328$ g/cm$^3$. With a weight of about 0.6 mg and the value of L/b (ratio of beam length to beam width) fixed at 10, the sensitivity $R_x$ of accelerometer 25 from equation (10) is $$R_x = 24000/Lt^2 (Hz/ms^{-2})$$

where L and t are in the unit of micrometers. A plot of sensitivity $R_x$ vesus L with four different values of t is shown in FIG. 3.

Lastly, from equation (11) the dynamic range of the accelerometer with a weight of 0.6 mg and L/b=10 is $$A_{max} = 1.64 \times 10^{15} t^3/L$$

with L=200 μm and t=1 μm, we have $A_{max}$=822 ms$^{-2}$=84 G, where G=9.8 ms$^{-2}$ is the earth gravitational constant.

Based on the above analysis and considering the possible intrinsic stress in poly Si, a set of resonant accelerometers embodying the present invention are designed with the following parameters:
Weight (M)=0.6 mg
Length of beams (L)=200 μm, 150 μm, 100 μm
Width of beams (b)=20 μm, 15 μm, 10 μm
Thickness of beams (t)=1 μm With such parameters, the beam resonant frequency is $$200 \text{ KHz} \leq f_0 \leq 800 \text{ KHz}$$

The sensitivity is $$1.1(\text{KHz/G}) \leq R_x \leq 2.4(\text{KHz/G})$$

and the maximum acceleration is $$80 \text{ G} \leq A_{max} \leq 160 \text{ G}.$$

Figure 4A:
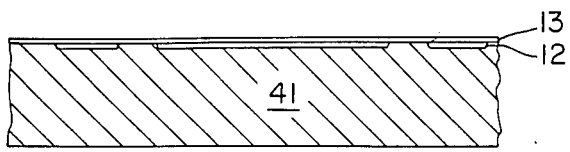
FIGS. 4a through 4e illustrate the major processing steps for the fabrication of the embodiment in FIGS. 1a and 1b.
Figure 4B:
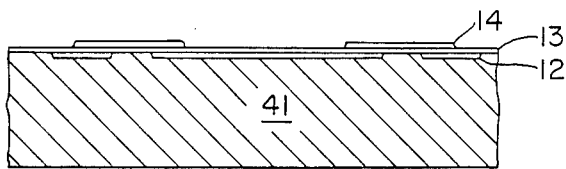

The major fabrication processes for a preferred embodiment is illustrated in FIGS. 4a–4e which are cross-sections along a common longitudinal axis of a pair of beams. A 4 μm thick heavy boron doped layer 12 with doping concentration greater than $5 \times 10^{19}$ cm$^{-3}$ is formed over a silicon wafer 41 by ion implantation or diffusion as shown in FIG. 4a. This layer 12 is later used as the etch-stop in the shaping of the weight and beam formation process. Layer 12 is also used to support end regions of the electrodes. The doped layer 12 is activated, by thermal annealing in this case, and a 5000 Å thick layer of SiO$_2$ is thermally grown at 13 in FIG. 4a. This is followed by a low pressure chemical vapor deposition (LPCVD) of 1.25 μm thick polycrystalline silicon (polySi I) 14. The four beams are delineated into the polySi I layer 14 by plasma etching using sulfur hexafluoride (SF$_6$) as shown in FIG. 4b.

Figure 4C:
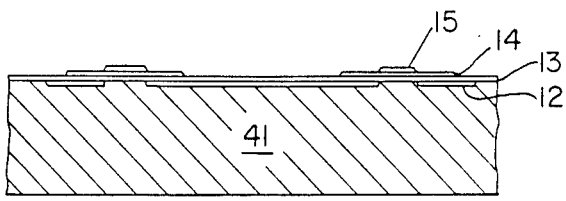
Figure 4D:
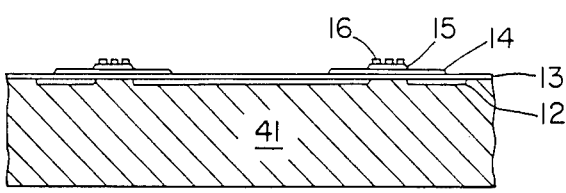

Two μm of phosphosilicate glass (PSG) are then deposited and delineated at 15 in FIG. 4c. The PSG pedestal 15 is used to define the suspended length of the drive (10, 20, 30, 40) and sense (21, 22, 23, 24) electrodes which bridge over respective beams 38, 36, 34, 32 of FIG. 1a and their spacing with respect to the resonant beams delineated into layer 14. A second layer 16 of polySi (polySi II) with a thickness of 1 μm is deposited on top of the PSG pedestal 15, and the drive and sense electrodes are delineated into this layer 16 in FIG. 4d. Contact holes through the PSG pedestal 15 to the polySi I layer 14 are opened and a 1 μm thick aluminum layer is deposited through the contact holes to the polySi I layer 14 and delineated to form metal bonding pads on each beam.

Figure 5:
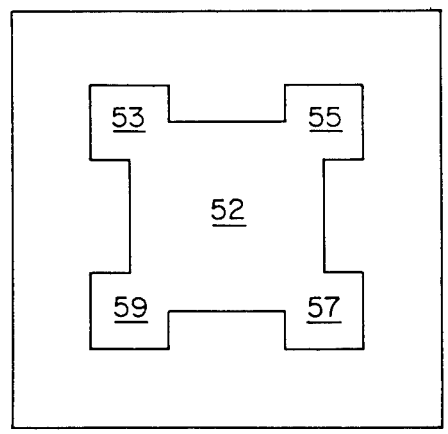
FIG. 5 is a schematic of the mask used for sample mass etching in the processing steps of FIGS. 4a–4e.

The shaping of the weight 11 is accomplished through the backside of the wafer 41 using an orientation-dependent wet chemical etching technique with EDP as the etchant. Prior to EDP etching, the front side of the wafer 41 is coated with a masking film. In order to avoid undercutting of convex corners during EDP etching, a corner compensation scheme is used. In this scheme, a regularly used masking $SiO_2$ square 52 (for defining a square shaped device) is modified by adding an extra $SiO_2$ square 53, 55, 57, 59 to each of its corners, as shown in FIG. 5.

Figure 4E:
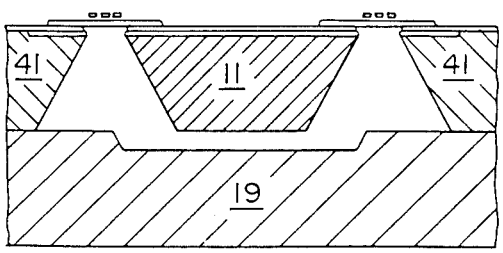

After the weight 11 is shaped, the wafer 41 is dipped into BHF to remove the remaining thermal $SiO_2$ layer 13 and PSG spacer 15 (FIG. 4e). The masking film on the front side of wafer 41 is also removed. In order to keep the weight mass 11 from frictional contact with the support, properly positioned cavities are etched in another silicon wafer 19, and the wafer 19 is bonded to the device wafer 41 to form a support as shown in the lower part of FIG. 4e. Electrodes may then be deposited on wafer 19 for means for measuring perpendicular acceleration.

It is understood that variations in the fabrication process, such as the use of other materials compatible with the etching and the drive and sense scheme used, are possible. Further other techniques, besides chemical etching for removal of spacer layers is suitable.

One fabrication complication arises from the existence of stress due to mismatches in thermal expansion coefficients between film and substrate or to nucleation and grain-growth phenomena during deposition. In a constrained structure, such as beams 32, 34, 36, 38, the residual stress causes a static tension or compression that shifts the resonant frequency. Furthermore longterm relation of residual stress induces spurious drifts in the resonant frequency.

The control of residual stress in thin films is achieved by modifications in the film deposition conditions and by annealing. Annealing is effective in relaxing residual stress in polysilicon films. However, the requisite high temperature of greater than 1050° C. are undesirable in a fabrication process that includes active electronic devices because of excessive dopant redistribution. Hence, some designs of the present invention may choose off-chip circuitry over on-chip circuitry.

It is appreciated that the drive of the beams and detection of beam vibration can be accomplished using a variety of methods. For example, excitation may be accomplished by thermal expansion, piezoelectric films as well as by capacitive electrostatics as disclosed and incorporated herein by reference in H. C. Nathanson, W. E. Newell, R. A. Wickstrom, and J. R. Davis, Jr., "The resonant gate transistor," *IEEE Trans. on Electron Devices*, ED-14, 117–133, (1967);

R. T. Howe and R. S. Muller, "Resonant-microbridge vapor sensor," *IEEE Trans. on Electron Devices*, ED-33, 499–506, (1986);

T. S. J. Lammerink and W. Wlodarski, "Integrated thermally excited resonant diaphragm pressure sensor," Proceedings of the 3rd International Conference on Solid-State Sensors and Actuators, (Transducers '85), 97–100, (1985); and P. M. Zavracky, "Piezeoelectrically driven resonant ribbons," Preceedings of the 3rd International Conference on Solid-State Sensors and Actuators, (Transducers '85), 109–112, (1985).

Likewise, readout of the vibration of a micromechanical structure (beams 32, 34, 36, 38) can be accomplished capacitively, piezoelectrically and optically as disclosed and incorporated herein by reference in M. A. Schmidt and R. T. Howe, "Silicon Resonant Microsensors," Ceramic Engineering and Science Proceedings, Automotive Materials Conference, Nov. 19, 1986;

R. T. Howe and R. S. Muller, "Resonant-microbridge vapor sensor," *IEEE Trans. on Electron Devices*, ED-33, 499–506, (1986);

J. G. Smits, H. A. C. Tilmans, and T. S. J. Lammerink, "Pressure dependence of resonant diaphragm pressure sensors," Preceedings of th 3rd International Conference on Solid-State Sensors and Actuators, (Transducers '85), 93–96, (1985); and U.S. patent application, Ser. No. 932,780, assigned to Massachusetts Institute of Technology, the assignee of the present invention.

Of the various drive and detection methods, the capactive approach has an advantage for resonant microsensors. Given a conducting microstructure, electrostatic fields can exert drive forces and enable detection of changes in electrode spacing without modification of the resonating element. In contrast to the other methods, there is no need to incorporate diffusions for heat resistors or piezoelectric films and electrodes into the microstructure. The simplicity of this structural design also makes it easier to control stress and solve potential fatigue problems.

In the preferred embodiment of FIGS. 1a and 1b, beams 32, 34, 36, 38 are resonated by applying a dc bias voltage $V_p$ and a sinusoidal drive voltage $V_d$ to respective drive electrodes 40, 30, 20, 10. An electronic schematic of beams 34 and 38 is provided in FIG. 6. An electrostatic force is activated across the thin gaps 43 formed between the respective drive electrodes and beams. Gap 43 must be thin enough to support an electric field with a strength large enough to excite the beams. This is accomplished through the surface micromachining techniques previously described. In addition, each drive electrode 40, 30, 20, 10 is positioned at a midpoint of the length of its respective beam 32, 34, 36 38 to obtain a fundamental harmonic in the excitation of each beam. However, different positioning and excitation of the drive electrodes is capable of obtaining higher harmonics.

Vibration of each beam causes capacitance of gap 43 to be time-varying, and thereby generates a current $i_s$ equal to $$V_s \frac{dC_s}{dt}$$

where $V_s$ is the voltage produced by $i_s$, and the capacitance between each sense electrode and respective beam is $C_s/2$. The sense electrodes of each beam detect the time-varying capacitance $C_s$ and thus detect the respective beam deflection or vibration since $C_s$ is proportional to the deflection/vibration. The sensed movement of the beam is measured in a feedback circuit which sets voltage $V_d$ of the respective drive electrode equal to the resonant frequency of the beam. A self-sustained oscillation of the beam is thus achieved and maintained for each beam through the respective sense and drive electrodes of the beam.

Figure 6:
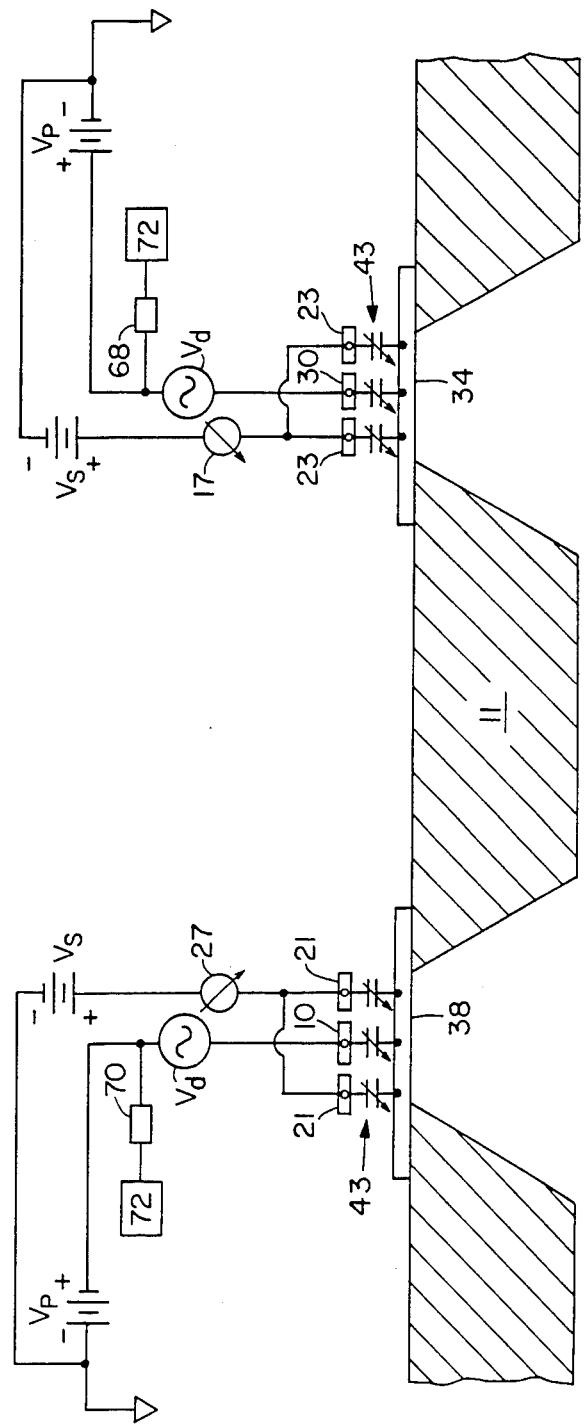
FIG. 6 is an electrical schematic of the accelerometer of FIGS. 1a and 1b.
Figure 7:
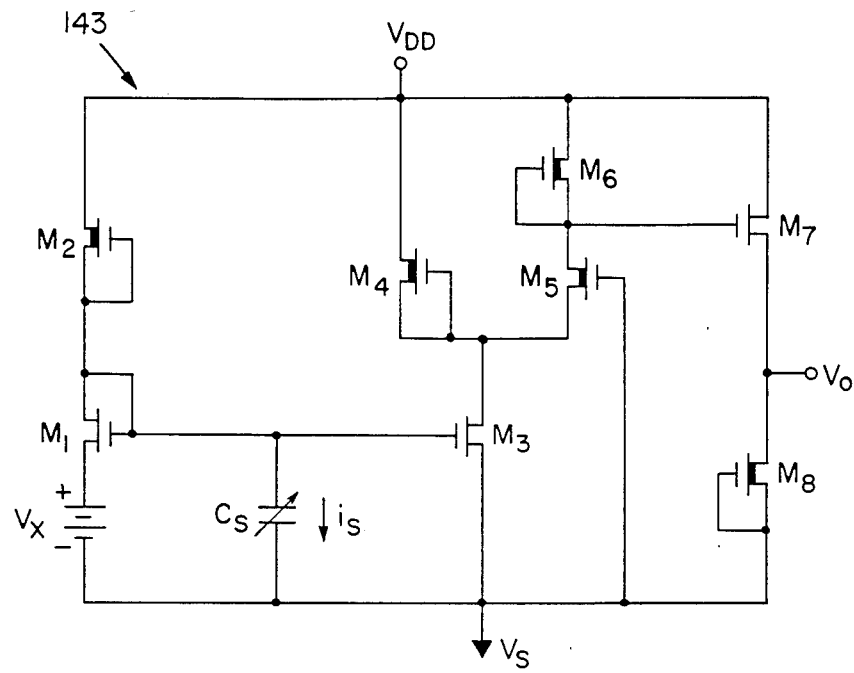
FIG. 7 is an electrical schematic of the electrical circuit used in the accelerometer of FIGS. 1a and 1b.

In one such feedback circuit, the sensed current $i_s$ is measured by respective ammeters of each beam illustrated in FIG. 6 as ammeters 17 and 27 of beams 34 and 38 respectively. The sensed current $i_s$ is converted into a $V_d$ voltage signal, amplified and buffered using an on-chip NMOS circuit 43 shown in FIG. 7. Neglecting parasitic and device capacitances, $i_s$ produces a sensed voltage $V_s$ proportional to $i_s/g_{ml}$ at the gate of the transistor $M_3$ where $g_{ml}$ is the gain of amplifier $M_1$. The NMOS circuit 43 of FIG. 7 includes am external voltage source $V_x$ that is necessary for biasing the amplifier if the enhancement and depletion threshold voltages $V_o$ and $V_{DD}$ respectively deviate from their design values. Transistors $M_4$, $M_5$, and $M_6$ constitute a standard NMOS active load for transistor $M_3$ that minimizes gain degradation due to the body effect. A source-follower stage buffers the output sensed voltage $V_s$.

Other electromechanical oscillators for achieving a self-sustained oscillation of the beams are suitable.

Further, the output of the device 25 is preferrably accomplished by a signal processor circuit 72 shown in FIG. 6. The frequency measuring circuit of each beam (shown as 68, 70 for beams 34, 38 respectively) detects the frequency of the respective drive electrode voltage $V_d$. The difference between detected frequencies of beams along a common axis is then produced in signal processor circuit 72 which in turn provides an indication of acceleration as a function of the sensed frequency difference.

Other circuits which involve counters, digital means, or the like for measuring the frequency of voltage $V_d$ for each beam are suitable. In the case of digital means, a user or computer system can directly calculate the frequency difference to provide an output of accelerometer 25.

IMPROVED STRUCTURE

Figure 8:
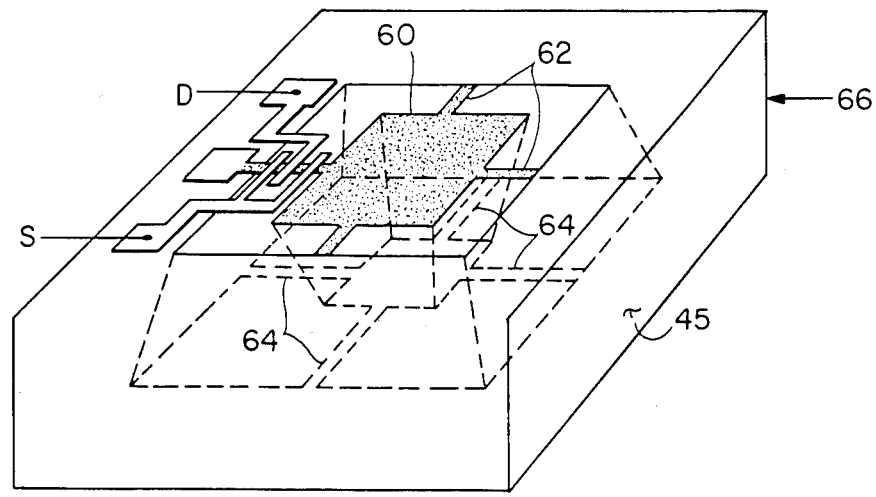
FIG. 8 is a perspective view of an alternative embodiment of the invention in which additional constraining arms suppress rotation of the sample mass.

Finite element analysis indicates that the embodiment of FIGS. 1a and 1b is limited in dynamic range due to rotation of the weight 11, which causes the resonating beams 32, 34, 36, 38 to contrast the sense electrodes 21, 22, 23, 24 at lower acceleration $A_x$ than predicted by equation (11). An improved accelerometer design is illustrated in FIG. 8, in which four additional constraining arms or bridges 64 have been micromachined on the backside 45 of the silicon wafer 66. Finite element analysis indicates that the constraining bridges 64 suppress rotation and thereby increase the dynamic range. In addition, the improved design is predicted to have higher sensitivity $R_x$.

The 4 $\mu$m-thick constraining bridges 64 are fabricated by means of an additional masked boron implant on the backside 45 of the wafer 66. This implant is performed after the partial anneal of the front side boron etch-stop implant of FIG. 4a. Undercutting of the backside boron-doped regions occurs during shaping of the weight which forms the constraining bridges 64. The resonant arms 62, sample mass 60, sense and drive electrodes referenced by S and D respectively in FIG. 8 are fabricated and operate in the same manner as respective parts in accelerometer 25 of FIGS. 1a and 1b.

THIRD DIRECTION MEASUREMENT

Beams 32 and 36 of FIG. 1a provide a measurement of acceleration along the y-axis and beams 34 and 38 provide a measurement along the x-axis. Measurement along a third direction may be provided by sandwiching the accelerometer of FIG. 1a or 8 between mountings 74 and 76 shown in FIG. 9. Mountings 74 and 76 preferably comprise pyrex or silicon wafers and have cavities etched in facing sides so as to allow movement of the proof mass 11, and beams 32, 34, 36, 38 and constraining bridges 64 if any. At least one additional beam 78 is positioned between any two of the beams 32, 34, 36 or 38 and similarly bridges between substrate 28 and proof mass 11. Deflection of additional beam 78 is measured in a similar manner that cantilever beams in prior art accelerometers are measured as described and incorporated herein by reference in Martin A. Schmidt and Roger T. Howe, "Silicon Resonant Microsensors", *Ceramic Engineering and Science Proceedings*, Automotive Materials Conference, Nov. 19, 1986; and L. M. Roylance and J. B. Angell, "A batch-fabricated silicon accelerometer", *IEEE Trans. on Electron Devices*, ED-26, 1911–1917, (1979).

Figure 9:
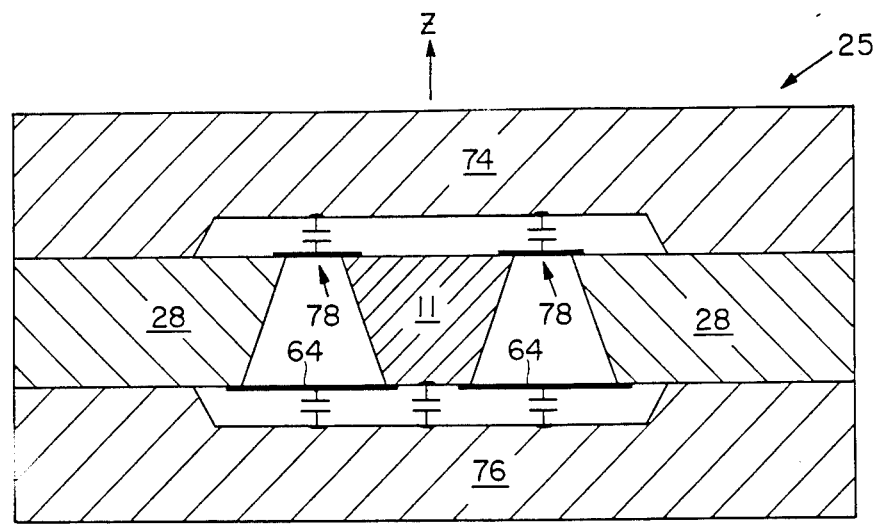
FIG. 9 is a cross-section of an alternative embodiment which measures acceleration in three directions.

The measurement provides an indication of acceleration in a direction perpendicular to the longitudinal axis of beam 78, that is in a z-direction as shown in FIG. 9.

Alternative to the additional beam 78, constraining bridges 64 or electrodes deposited on weight 11 may be used. Bridges 64 would be capacitively coupled to mounting 76. A measurement of the change in capacity would provide an indication of the deflection of bridges 64 and thereby acceleration of device 25 in the z-direction. The capacitance measuring techniques of the foregoing references similarly apply to the measurement of deflection of bridges 64 or displacement of weight 11.

Figure 10:
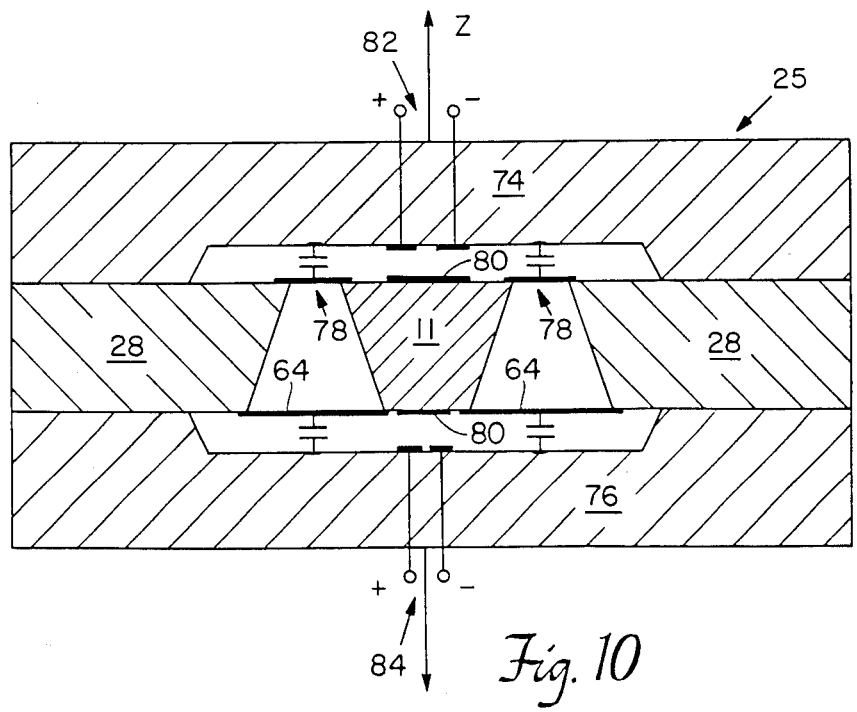
FIG. 10 is a cross-section of another alternative embodiment which measures acceleration in three directions.

An alternative technique for measuring perpendicular acceleration is to use electrodes 80, 82 and 84 on weight 11 and mountings 74 and 76, respectively, to couple an electrostatic force that cancels the displacement of the weight. In that technique as illustrated in FIG. 10, the deflection of weight 11 is sensed by additional arms 78 or bridges 64 as described above. A feedback amplifier converts the detected signals into amplified voltages that are applied across drive electrodes 82 and drive electrodes 84 on supports 74 and 76 respectively, in order to null the displacement of weight 11. One of the applied voltages provides the output signal indicating perpendicular acceleration.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. An accelerometer comprising:
   a weight;
   at least 2 micromachined mechanical beams for substantially equally suspending the weight from a support, one arm having one end attached to one side of the weight and the second arm having one end attached to an opposite side of the weight such that respective longitudinal axes of the one and second arms form a common axis through the weight, said arms vibrating at respective resonant frequencies in respective planes through the common axis; and means for measuring a difference in resonant frequencies between said one arm and second arm to provide an indication of acceleration in a direction along the common axis, the respective resonant frequency of each arm changing as a function of extension or compression of the arm due to acceleration of the support.

2. An accelerometer as claimed in claim 1 wherein said arms are excited to vibrate by electrostatic means.

3. An accelerometer as claimed in claim 2 wherein the electrostatic means include a drive electrode adjacent to each arm centrally located along the longitudinal axis of the respective arm.

4. An accelerometer as claimed in claim 2 wherein the electrostatic means comprise:

a drive electrode for each arm, each drive electrode positioned across a gap from the respective arm;

at least one sense electrode for each arm, each sense electrode positioned across the gap from the respective arm and adjacent to the drive electrode of the respective arm, vibration of the respective arm producing a time-varying capacitance across the gap;

a feedback vibration-detection circuit for each arm connected to the drive electrode and the sense electrodes of the respective arm, the circuit sensing through the sense electrode changes in the time varying capacitance of the respective arm and thereby sensing changes in the vibration of the arm and the circuit applying voltage to the drive electrodes as a function of the sensed changes in capacitance.

5. A accelerometer as claimed in claim 4 wherein said sense and drive electrodes of a respective arm are positioned across the gap by an extension of the support along opposite longitudinal sides of the arm, the extension along each side supporting the sense and drive electrodes such that the sense and drive electrodes bridge over the arm between the extension on opposite longitudinal sides of the arm.

6. An accelerometer as claimed in claim 4 wherein said means for measuring include a frequency measuring circuit for each arm connected to the feedback vibration detection circuit of the respective arm.

7. An accelerometer as claimed in claim 1 wherein the arms are resonated by an electromechanical oscillator.

8. An accelerometer as claimed in claim 1 wherein dimensions of said weight and arms are substantially small compared to dimensions of a subject to which the support is attached.

9. An accelerometer as claimed in claim 8 wherein the dimensions of each arm includes
a length of about 50 $\mu$m to about 500 $\mu$m;
a width of about 10 $\mu$m to about 100 $\mu$m; and
a thickness of less than about 5 $\mu$m.

10. An accelerometer as claimed in claim 1 further comprising a plurality of constraining arms attached to the weigh to suppress rotation of the weight.

11. An accelerometer as claimed in claim 1 wherein four arms suspend the weight, two arms forming a common first axis through the weight, the other two arms forming a common second axis through the weight perpendicular to the first axis, the change in difference in resonant frequencies between the two arms of the first axis providing an indication of a component of acceleration along the first axis at the same time the change in difference in resonant frequencies between the other two arms provide an indication of an orthogonal component of acceleration along the second axis.

12. An accelerometer as claimed in claim 11 further comprising means for measuring acceleration in a direction perpendicular to the first and second axes.

13. An accelerometer as claimed in claim 12 wherein the means for measuring acceleration in a direction perpendicular to the axes include electrostatic force balance means.

14. An accelerometer as claimed in claim 1 wherein the means for measuring include a frequency measuring circuit for each arm.

15. An accelerometer comprising:
a weight centrally positioned within a support;
at least two pairs of micromachined mechanical beams for substantially equally suspending the weight from the support, each pair having one arm with one end attached to one side of the weight and a second arm with one end attached to an opposite side of the weight and respective opposite ends of the one and second arms attached to the support such that the one and second arms form a common longitudinal axis through the weight, the formed axes of the two pairs of arms being perpendicular to each other;
means for vibrating each arm at a respective resonant frequency in a respective plane through its respective common axis; and
means for simultaneously measuring in each pair of arms a change in difference in resonant frequencies between the one and second arms of the pair to provide an indication of acceleration in a direction along the respective common axis formed by the pair of arms, the simultaneous measuring in the two pairs providing an indication of orthogonal components of acceleration, the resonant frequency of each arm changing as a function of extension or compression of the arm due to acceleration of the support.

16. An accelerometer as claimed in claim 15 wherein the the means for vibrating each arm include:
a drive electrode for each arm, each drive electrode positioned across a gap from the respective arm;
a pair of sense electrodes for each arm, one sense electrode positioned adjacent to one side of the drive electrode and the other sense electrode positioned adjacent to an opposite side of the drive electrode, the pair of sense electrodes positioned across the gap from the respective arm, vibration of the respective arm producing a time varying capacitance across the gap; and
a feedback vibration-detection circuit for each arm connected to the drive electrode and pair of sense electrodes of the respective arm, the circuit sensing through the pair of sense electrodes changes in the time varying capacitance and thereby the changes in vibration of the respective arm, and the circuit causing the drive electrode to exert a force on the arm as a function of the sensed changes in vibration to maintain vibration of each arm at the respective resonant frequency.

17. Accelerometer as claimed in claim 16 wherein the pair of sense electrodes and drive electrode of a respective arm are positioned across the gap by an extension of the support along opposite longitudinal sides of the arm supporting end regions of the sense and drive electrodes such that the sense and drive electrodes bridge across the gap over the arm between the extension on opposite longitudinal sides of the arm.

18. An accelerometer as claimed in claim 16 wherein said means for simultaneously measuring includes a frequency measuring circuit for each arm connected to the feedback vibration detection circuit.

19. An accelerometer as claimed in claim 15 further comprising a plurality of constraining arms attached to the weight to suppress rotation of the weight.

20. An accelerometer as claimed in claim 15 wherein said measuring means includes a frequency measuring circuit for each arm.

21. An accelerometer as claimed in claim 15 further comprising means for measuring acceleration in a direction perpendicular to the axes formed by the two pairs of arms.

22. An accelerometer as claimed in claim 21 wherein the means for measuring acceleration in a direction perpendicular to the axes include electrostatic force balance means.

23. An accelerometer comprising:
a weight;
at least two arms suspending the weight from a support, one arm having one end attached to one side of the weight and the second arm having one end attached to an opposite side of the weight such that respective longitudinal axes of the one and second arms form a common axis through the weight, said arms being excited by electrostatic means such that they vibrate at respective resonant frequencies; and
means for measuring a difference in resonant frequencies between said one arm and second arm to provide an indication of acceleration in a direction along the common axis, the respective resonant frequency of each arm changing as a function of extension or compression of the arm due to acceleration of the support.

24. An accelerometer as claimed in claim 23 wherein the electrostatic means include a drive electrode adjacent to each arm centrally located along the longitudinal axis of the respective arm.

25. An accelerometer as claimed in claim 23 wherein the electrostatic means comprise:
a drive electrode for each arm, each drive electrode positioned across a gap from the respective arm;
at least one sense electrode for each arm, each sense electrode positioned across the gap from the respective arm and adjacent to the drive electrode of the respective arm, vibration of the respective arm producing a time-varying capacitance across the gap;
a feedback vibration detection circuit for each arm connected to the drive electrode and the sense electrodes of the respective arm, the circuit sensing through the sense electrodes, changes in the time varying capacitance of the respective arm and thereby sensing changes in the vibration of the arm and the circuit applying voltage to the drive electrodes as a function of the sensed changes in capacitance.

26. An accelerometer as claimed in claim 25 wherein said sense and drive electrodes of a respective arm are positioned across the gap by an extension of the support along opposite longitudinal sides of the arm, the extension along each side supporting the sense and drive electrodes such that the sense and drive electrodes bridge over the arm between the extension on opposite longitudinal sides of the arm.

27. An accelerometer as claimed in claim 25 wherein said means for measuring include a frequency measuring circuit for each arm connected to the feedback vibration detection circuit of the respective arm.

28. An accelerometer comprising:
a weight;
at least two arms for suspending the weight from a support, one arm having one end attached to one side of the weight and the second arm having one end attached to an opposite side of the weight such that respective longitudinal axes of the one and second arms form a common axis through the weight, said arms vibrating at respective resonant frequencies,
said weight and arms having dimensions substantially small compared to dimensions of a subject to which the support is attached, the dimensions of each arm including
a length of about 50 microns to about 500 microns;
a width of about 10 microns to about 100 microns; and
a thickness of less than about 5 microns; and
means for measuring a difference in resonant frequencies between said one arm and second arm to provide an indication of acceleration in a direction along the common axis, the respective resonant frequency of each arm changing as a function of extension or compression of the arm due to acceleration of the support.

29. An accelerometer comprising:
a weight;
at least two arms for suspending the weight from a support, one arm having one end attached to one side of the weight and the second arm having one end attached to an opposite side of the weight such that respective longitudinal axes of the one and second arms form a common axis through the weight, said arms vibrating at respective resonant frequencies; and
means for measuring a difference in resonant frequencies between said one arm and second arm to provide an indication of acceleration in a direction along the common axis, the respective resonant frequency of each arm changing as a function of extension or compression of the arm due to acceleration of the support,
the means for measuring including a frequency measuring circuit for each arm.

30. An accelerometer comprising:
a weight centrally positioned within a support;
at least two pairs of arms for suspending the weight from the support, each pair having one arm with one end attached to one side of the weight and a second arm with one end attached to an opposite side of the weight and respective opposite ends of the one and second arms attached to the support such that the one and second arms form a common longitudinal axis through the weight, the formed axes of the two pairs of arms being perpendicular to each other;
means for vibrating each arm at a respective resonant frequency, the means for vibrating each arm including:
a drive electrode for each arm, each drive electrode positioned across a gap form the respective arm;

a pair of sense electrodes for each arm, one sense electrode positioned adjacent one side of the drive electrode and the other sense electrode positioned adjacent to an opposite side of the drive electrode, the pair of sense electrodes positioned across the gap from the respective arm, vibration of the respective arm producing a time varying capacitance across the gap; and a feedback vibration detection circuit for each arm connected to the drive electrode and pair of sense electrodes of the respective arm, the circuit sensing through the pair of sense electrodes changes in the time varying capacitance and thereby the changes in vibration of the respective arm, and the circuit causing the drive electrode to exert a force on the arm as a function of the sensed changes in vibration to maintain vibration of each arm at the respective resonant frequency; and means for simultaneously measuring in each pair of arms a difference in resonant frequencies between the one and second arms of the pair to provide an indication of acceleration in a direction along the respective common axis formed by the pair of arms, the simultaneous measuring in the two pairs providing an indication of orthogonal components of acceleration, the resonant frequency of each arm changing as a function of extension or compression of the arm due to acceleration of the support.

31. An accelerometer as claimed in claim 30 wherein the pair of sense electrodes and drive electrode of a respective arm are positioned across the gap by an extension of the support along opposite longitudinal sides of the arm supporting end regions of the sense and drive electrodes such that the sense and drive electrodes bridge across the gap over the arm between the extension on opposite longitudinal sides of the arm.

32. An accelerometer as claimed in claim 30 wherein said means for simultaneously measuring includes a frequency measuring circuit for each arm connected to the feedback vibration detection circuit.

33. An accelerometer comprising:

a weight centrally positioned within a support;

at least two pairs of arms for suspending the weight from the support, each pair having one arm with one end attached to one side of the weight and a second arm with one end attached to an opposite side of the weight and respective opposite ends of the one and second arms attached to the support such that the one and second arms form a common longitudinal axis through the weight, the formed axes of the two pairs of arms being perpendicular to each other;

means for vibrating each arm at a respective resonant frequency; and means for simultaneously measuring in each pair of arms a difference in resonant frequencies between the one and second arms of the pair to provide an indication of acceleration in a direction along the respective common axis formed by the pair of arms, the simultaneous measuring in the two pairs providing an indication of orthogonal components of acceleration, the resonant frequency of each arm changing as a function of extension or compression of the arm due to acceleration of support, said means for measuring including a frequency measuring circuit for each arm.

34. An accelerometer comprising:

a weight;

at least 4 arms for substantially equally suspending the weight from a support, two arms forming a common first axis through the weight, the other two arms forming a common second axis through the weight perpendicular to the first axis, a change in difference in resonant frequencies between the two arms of the first axis providing an indication of a component of acceleration along the first axis at the same time a change in difference in resonant frequencies between the other two arms provide an indication of an orthogonal component of acceleration along the second axis;

means for measuring the change in difference in resonant frequencies between the two arms of the first axis and the change in difference in resonant frequencies between the other two arms, the respective resonant frequency of each arm along a common axis changing as a function of extension or compression of the arm due to acceleration of the support in a direction along the common axis; and means for measuring acceleration in a direction perpendicular to the first and second axes, the means including electrostatic force balance means.

35. An accelerometer comprising:

a weight centrally positioned within a support;

at least two pairs of arms for substantially equally suspending the weight from the support, each pair having one arm with one end attached to one side of the weight and a second arm with one end attached to an opposite side of the weight and respective opposite ends of the one and second arms attached to the support such that the one and second arms form a common longitudinal axis through the weight, the formed axis of the two pairs of the arms being perpendicular to each other;

means for vibrating each arm at a respective resonant frequency in a respective plane through its respective common axis;

means for simultaneously measuring in each pair of arms a change in difference in resonant frequencies between the one and second arms of the pair to provide an indication of acceleration in a direction along the respective common axis formed by the pair of arms, the simultaneous measuring in the two pairs providing an indication of orthogonal components of acceleration, the resonant frequency of each arm changing as a function of extension or compression of the arm due to acceleration of the support; and electrostatic force balance means for measuring acceleration in a direction perpendicular to the axes formed by the two pairs of arms.

* * * * *